(12) United States Patent
Murphy et al.

(10) Patent No.: US 10,118,147 B1
(45) Date of Patent: Nov. 6, 2018

(54) TUBULAR WATERWALL STRUCTURE IN A FLUIDIZED BED REACTION CHAMBER AND A FLUIDIZED BED REACTION CHAMBER

(71) Applicant: Sumitomo SHI FW Energia Oy, Espoo (FI)

(72) Inventors: John Murphy, Hanoi (VN); Pentti Lankinen, Varkaus (FI)

(73) Assignee: Sumitomo SHI FW Energia Oy, Espoo (FI)

( * ) Notice: Subject to any disclaimer, the term of this patent is extended or adjusted under 35 U.S.C. 154(b) by 0 days.

(21) Appl. No.: 15/648,491

(22) Filed: Jul. 13, 2017

(51) Int. Cl.
  *B01J 8/24* (2006.01)
  *B01J 8/18* (2006.01)

(52) U.S. Cl.
  CPC .............. *B01J 8/1836* (2013.01); *B01J 8/24* (2013.01); *B01J 2208/00132* (2013.01); *B01J 2208/00194* (2013.01)

(58) Field of Classification Search
  CPC .................................. B01J 8/24; B01J 8/1836
  USPC ....................................................... 422/146
  See application file for complete search history.

(56) References Cited

U.S. PATENT DOCUMENTS

| 4,554,967 A | * | 11/1985 | Johnson .................. | F28F 19/00 |
| | | | | 122/367.1 |
| 5,091,156 A | | 2/1992 | Ijas et al. | |
| 5,910,290 A | * | 6/1999 | Hyppanen .............. | B04C 5/085 |
| | | | | 110/263 |

FOREIGN PATENT DOCUMENTS

| CN | 202195476 U | 4/2012 |
| EP | 1 953 452 A2 | 8/2008 |
| JP | H08-189601 A | 7/1996 |
| JP | 2984572 B2 | 9/1999 |
| JP | 2004-333041 A | 11/2004 |

* cited by examiner

*Primary Examiner* — Huy Tram Nguyen
(74) *Attorney, Agent, or Firm* — Fitzpatrick, Cella, Harper & Scinto

(57) ABSTRACT

A tubular waterwall structure in a fluidized bed reaction chamber includes horizontally adjacent first and second portions forming a corner structure and constituted by vertical tubes and fins centrally attached to the tubes and having a first width. The first wall portion has an outermost tube next to the corner, an upper portion defining an upper vertical plane in an upper level range and a lower portion defining a lower (outwards) vertical plane in a lower level range. The lower portion has a refractory lining. The second wall portion is vertical and has an outermost tube next to the corner. The outermost tube of the second wall portion is in the lower level region connected to the outermost tube of the first wall portion by a planar lower beveled corner fin having a refractory lining and a width that is larger than the first width.

34 Claims, 3 Drawing Sheets

US 10,118,147 B1

TUBULAR WATERWALL STRUCTURE IN A FLUIDIZED BED REACTION CHAMBER AND A FLUIDIZED BED REACTION CHAMBER

BACKGROUND OF THE INVENTION

Field of the Invention

The present invention relates to a tubular waterwall structure in a fluidized bed reaction chamber and a fluidized bed reaction chamber with a tubular waterwall structure. The invention relates especially to a corner structure formed by horizontally adjacent first and second wall portions, wherein a lower portion of the first wall portion is shifted outwards and has a refractory lining.

Description of the Related Art

The reaction chamber of a conventional fluidized bed reactor is defined by vertical tubular waterwalls, which are made of parallel metal tubes connected together by metal strips, so-called fins. High pressure water flows inside the tubes to extract heat from high temperature particles and gases in the reactor. The tubular waterwalls of the reaction chamber of a fluidized bed reactor often comprise two walls, so-called a front wall and a rear wall, which have a vertical upper portion and an inwards tapered lower portion, and two vertical walls, so-called sidewalls of the chamber.

Due to vigorously moving bed particles, the tubular waterwalls, especially the lower portions of the tubular waterwalls, have a risk of erosion, especially if the reactor is operated outside of traditional or designed operating parameters. To minimize the erosion, the lower portions of the tubular waterwalls are conventionally protected by a layer of refractory. The upper edge of the refractory layer then forms a ledge that tends to be continuously hit by particles flowing downwards along the tubular waterwall of the reactor, whereby bouncing, or turbulent redirection, of particles from the ledge cause erosion of the vertical watertube panel above the refractory. To minimize the erosion at this area, the watertube panel is often protected by, for example, an overlay weld layer of suitable abrasion resistant metal. In order to minimize the bouncing of particles, the upper edge of the refractory is often at the same elevation in all four walls, and arranged in an outwards bent section of the tubular waterwall so that the inner, or fireside, surface of the refractory is flush with or recessed from the vertical tubewall, or tubular waterwall, there above, as originally suggested in the U.S. Pat. No. 5,091,156.

In a recent design, above the tapered refractory lined portions of the front wall or rear wall there is a vertical refractory lined wall portion that is recessed outwards from the plane of the vertical upper portion of the wall. In the following, the terms "outwards recessed," "outwards bent," and "outwards shifted" are used interchangeably, i.e., they all refer to a section or a portion of a surrounding wall of a chamber that is further away from the center of the chamber than a parallel, neighboring surrounding wall. Making such a shift naturally requires two bends to the vertical tubes forming the tubular waterwall, first a bend outwards and then a bend back to the vertical direction. When a bare, i.e., not refractory lined and not outwards recessed, vertical wall portion is horizontally adjacent to a refractory lined outwards recessed vertical wall portion, a corner is to be formed between the two different wall portions. The present invention relates especially to forming an advantageous corner structure between such different wall portions.

Generally, the reaction chamber of a fluidized bed reactor has a polygonal, usually a rectangular, horizontal cross section, and the erosion caused by the down-flowing particles is especially severe in the lower corner regions of the reaction chamber. Many patent documents show different corner structures for a fluidized bed reactor with the aim to minimize erosion in the corner region. European patent EP 1 953 452 B1 teaches forming, in a fluidized bed reaction chamber, a sharp corner between two tubular waterwalls having a bare top portion and a bottom portion lined with a layer of refractory material, wherein, in an intermediate zone between the top and bottom portions, a horizontal fraction of each of the tubular waterwalls disposed on either side of the corner is bent outwards relative to the vertical plane defined by the top portion and lined with a refractory layer.

Japanese patent document JP 8-189601 teaches forming a sharp corner between two refractory lined vertical tubular waterwalls in the lower portion of the reaction chamber, wherein the tubes above the corner section are bent inwards so as to form a beveled corner to protect the edge of the refractory lining. Japanese patent document JP 2984572 teaches forming a refractory lining with a beveled or a rounded inner surface to vertical tubular waterwalls forming in a sharp or beveled corner.

Japanese patent document JP 2004-333041 teaches forming a sharp corner between two tubular waterwalls, the tubular waterwalls having a refractory lining with a beveled inner surface formed between two partial fins attached perpendicular to the tubular waterwalls. Chinese patent document CN 202195476 U teaches forming a beveled corner fin between the outermost tubes of two tubular waterwalls and a refractory layer with an inner surface parallel to the corner fin extending between two second outermost tubes of the tubular waterwalls.

An object of the present invention is to provide an economical and an efficient tubular waterwall structure in a fluidized bed boiler, especially, a corner structure formed by horizontally adjacent first and second wall portions, wherein a lower portion of the first wall portion is shifted outwards and has a refractory lining.

SUMMARY OF THE INVENTION

According to one aspect, the present invention provides a tubular waterwall structure in a fluidized bed reaction chamber, the tubular waterwall structure comprising multiple vertically extending tubular waterwalls defining the reaction chamber, the tubular waterwalls comprising horizontally adjacent first and second wall portions forming a corner structure and being constituted by vertical tubes interconnected by fins attached to the tubes and having a first width, wherein the first wall portion has an outermost tube next to the corner, an upper portion defining an upper vertical plane in an upper level range and a lower portion defining a lower vertical plane in a lower level range, each of the tubes of the first wall portion being bent in an intermediate level region between the upper level region and the lower level region so that the lower vertical plane is shifted outwards from the upper vertical plane, wherein the lower portion has a refractory lining, the second wall portion being vertical and having an outermost tube next to the corner. The outermost tube of the second wall portion is in the lower level region connected to the outermost tube of the first wall portion by a planar lower beveled corner fin having a refractory lining and a width that is greater than the first width.

According to another aspect, the present invention provides a fluidized bed reaction chamber comprising a tubular waterwall structure according to any of the embodiments of the tubular waterwall structure described herein.

The term "refractory lining" is in this description used in its conventional meaning, i.e., it refers to a layer of suitable abrasion resistant material applied to the inner surface of erosion prone areas of the tubular waterwalls, especially, the lower portions thereof. The thickness of the refractory lining is typically about 50 mm, or about as large or slightly less than the distance between the centers of two adjacent tubes in the tubular waterwall.

The width of the lower beveled corner fin in the tubular waterwall structure according to the present invention is in practice determined by the size of the shift of the lower vertical plane from the upper vertical plane. Because the purpose of the shift is to protect the upper edge of the refractory lining and the tubes entering this refractory from erosion caused by bouncing bed material, the shift is usually at least as large as the thickness of the refractory lining. Thus, the shift is typically at least about 50 mm, or at least about as large or slightly less than the distance between the centers of two adjacent tubes in the tubular waterwall. Because the lower beveled corner fin extends from the outermost tube of the second wall portion to the outermost tube of the lower portion of the first wall portion, it has, preferably, a width that is at least twice the first width.

Because the fins of a tubular waterwall absorb heat from the reaction chamber, which heat is to be transported to the watertubes, the width of the fin determines the maximum temperature in the fin. According to the present invention, the use of a corner fin that is clearly wider than a conventional fin is made possible by having a refractory lining on the fin. The refractory lining of the corner fin is thus important to provide thermal insulation for the wide corner fin, and to thus prevent overheating of the fin.

According to a preferred embodiment of the present invention, the lower portion of the first wall portion has a refractory lining, but the second wall portion does not have a refractory lining. It is recognized that changes in vertical, or especially horizontal geometrical uniformity of the walls, induce erosion accelerating eddies of the flow of gas and particles in the reaction chamber. Therefore, at least two outermost tubes of the second wall portion advantageously have an erosion resistant coating that is clearly thinner than the refractory lining of the lower portion of the first wall and is without geometrical discontinuities that would further induce erosive eddies. It is advantageous to continue this coating from above the level of the outward bending of the first wall to below the upper edge of a refractory lining applied to a lower portion of the second wall. The coating of the tubes of the second wall is of non-insulating material, i.e., the coating maintains the level of thermal conductivity that allows efficient heating of water in the tubes.

The first wall portion is usually a portion of a front wall or rear wall, i.e., a tubular waterwall with an inwards tapered lower part, of the reaction chamber of a fluidized bed reactor. It is to be understood that the second wall portion is a portion of a tubular waterwall, usually, a vertical sidewall, of the reaction chamber of a fluidized bed reactor. The lower portion of the sidewall may in practice also have a refractory lining, the upper edge of the refractory lining being at a lower level than that of the front wall and rear wall. The upper edge of the refractory lining of the sidewall may in practice be, for example, at a level that is from one meter to two meters lower than that of the front wall and the rear wall.

According to a conventional solution, the upper edge of the refractory lining in the lower portion of each of the tubular waterwalls defining the reaction chamber is at the same level. Because the refractory lining generally acts as a thermal insulator, however, it is an advantage to be able to have the upper edge of the refractory lining of adjacent tubular waterwalls be at different levels, when the need for refractory lining is different for different walls. Especially, when there is a need for refractory lining only in a vertical portion of the front wall or rear wall, above the inwards tapered lower portion, it is an advantage to be able to form a corner between a vertical tubular waterwall portion with a refractory lining and a and a vertical tubular waterwall portion that is bare, i.e., without a refractory lining.

The present invention relates to forming a corner structure between two tubular waterwalls in a level range comprising the upper edge of the refractory lining of one of the tubular waterwalls, but wherein the other one of the tubular waterwalls is bare, i.e., it does not have a refractory lining. The bare tubular waterwall portions may advantageously be protected against erosion by a suitable weld overlay coating at least near to the portions of tubular waterwalls with refractory lining. The corner structure according to the present invention extends in practice down to the edge of a refractory lining on the sidewall, where all of the watertubes become buried in refractory.

According to a preferred embodiment of the present invention, the refractory lining of the lower portion of the first wall portion extends in horizontal direction at most to a vertical extension of the vertical plane of the upper portion. Thus, the refractory lining of the lower portion of the first wall portion is generally of a well-known type known, for example, as shown in U.S. Pat. No. 5,091,156.

In a conventional tubular waterwall construction, the fins are centrally attached to the tubes, i.e., the fins are arranged on the line between the centers of the adjacent tubes. Contrary to such conventional fins, the lower beveled corner fin is preferably connected to an outer portion of the outermost tube of each of the first and second wall portions. Moving the lower beveled corner fin outwards from the conventional central position makes it easier to form a relatively thick refractory layer on the corner fin, which is durable and prevents overheating of the beveled corner fin. Moving the corner fin also makes it possible to attach the refractory layer to the fin by an anchor, if desired.

The planar lower beveled corner fin discussed above does not extend above the lower level range, i.e., above the region where the tubes of the first wall portion are shifted outwards from the upper vertical plane. In the upper level range, the outermost tube of the second wall portion is, according to a preferred embodiment of the present invention, connected to the outermost tube of the first wall portion by a planar upper beveled corner fin having a width that is substantially equal to the first width. In the intermediate level region between the upper level region and the lower level region, the lower beveled corner fin may be omitted, or there may be a non-planar extension toward the upper beveled corner fin.

The planar upper beveled corner fin is preferably connected to an inner portion of the outermost tube of each of the first and second wall portions. Because the tubes of the first wall portion are bent outwards between the upper and lower level regions, the plane of the upper beveled corner fin forms an angle with the plane of the lower beveled corner fin. The angle between the planes of the upper and lower beveled corner fins is preferably from five degrees to fifteen degrees. The advantage provided by the positions of the upper and the lower beveled fins with respect to the outermost tubes of the first and second wall portions, respectively, will be explained below.

According to a preferred embodiment of the present invention, the upper beveled corner fin comprises a planar vertically extending partial fin, i.e., an extension that is in the plane of the upper beveled corner fin, to the lower level region. The partial fin is attached to the outermost tube of the second wall portion, but not to the outermost tube of the first wall portion. The width of the partial fin may be substantially equal to the first width, but, according to a preferred embodiment of the present invention, the width of the partial fin is smaller than the first width, for example, less than 70% of the first width.

With the above-described arrangement, the lower beveled fin and the vertically extending partial fin, i.e., the vertical extension of the upper beveled corner fin, form a partial cavity that can be advantageously utilized for providing a durable refractory lining for the lower beveled fin. The outer surface of the refractory lining of the lower beveled fin advantageously abuts the outermost tube of the second wall portion at the position of the vertically extending partial fin, whereby the otherwise vulnerable refractory edge is secured, and the tendency of the refractory lining to crack at the tube surface is mitigated.

According to a preferred embodiment of the present invention, the refractory lining of the lower beveled corner fin extends in horizontal direction to a plane formed as a horizontal extension of the partial fin. Because the partial fin is in the plane of the upper beveled corner fin, the refractory lining of the lower beveled corner fin is under the downward projection of the beveled upper corner fin and the upper portion of the outermost tube of the first wall portion. Therefore, the turbulent redirection of particles that would occur should downward flowing bed material hit the refractory edge is eliminated, minimizing the erosive eddies in that region.

The metal construction of the corner structure according the present invention is advantageously manufactured by making the metal construction ready in a shop, i.e., outside of the site of the fluidized bed reactor, and attaching the metal construction to a sidewall and a front wall or rear wall of the reaction chamber in the actual site. The vertical joints to a sidewall and a front wall or rear wall can then be made by a fin-to-fin weld in normal portions of the tubular waterwalls.

The above brief description, as well as further objects, features, and advantages of the present invention will be more fully appreciated by reference to the following detailed description of the currently preferred, but nonetheless illustrative, embodiments of the present invention, taken in conjunction with the accompanying drawings.

DETAILED DESCRIPTION OF THE INVENTION

Figure 1:
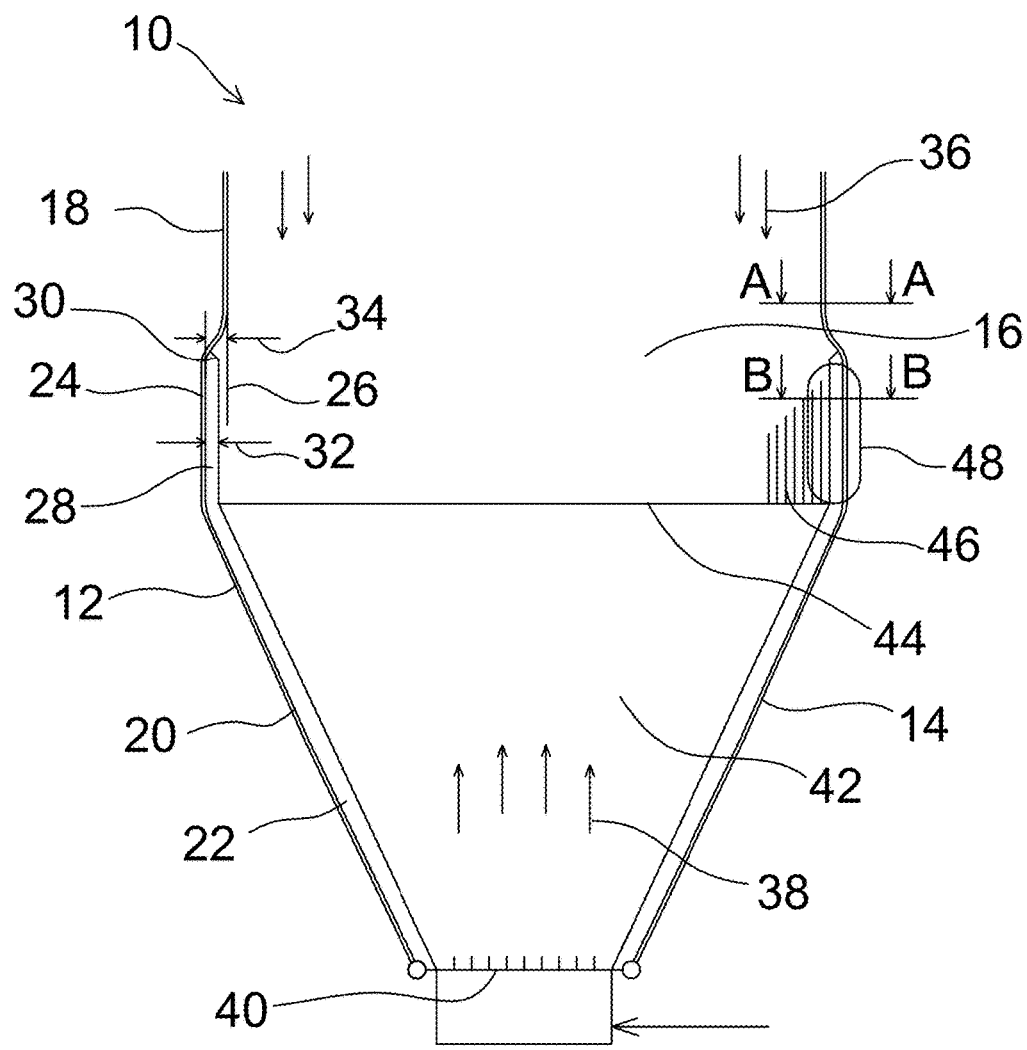
FIG. 1 schematically shows the bottom portion of a circulating fluidized bed reactor with a tubular waterwall structure according to an embodiment of the present invention.

FIG. 1 schematically shows the bottom portion of a fluidized bed reaction chamber 10 defined by conventional tubular waterwalls comprising a front wall 12, a rear wall 14, and two sidewalls 16, one of which is seen in FIG. 1. The front wall 12 and rear wall 14 have a vertical upper portion 18 and an inwards tapered lower portion 20 that is covered by a refractory lining 22. The front wall 12 and rear wall 14 have immediately above the inwards tapered lower portion 20 a vertical wall portion 24 that shifts outwards from the plane 26 of the vertical upper wall portion 18. The outwards shifted vertical wall portion 24 has a vertical refractory lining 28 with an upper edge 30. The thickness 32 of the vertical refractory lining is smaller than, or about as large as, the shift 34 of the outwards shifted vertical tubular waterwall portion 24, whereby the upper edge 30 of the refractory lining 28 is protected from bed particles 36 falling down in the vicinity of the front and rear walls due to internal circulation caused by fluidizing gas 38 injected to the reaction chamber through a bottom grid 40.

The lower portion of the sidewalls 16 is also protected by a refractory lining 42, the refractory lining 42 having an upper edge 44 that is at a lower level than the edge 30 of refractory lining of the front wall 12 and rear wall 14. Above the upper edge 44, the watertubes 46 of the sidewall are bare, i.e., without a thermally insulating refractory lining. The upper edge 44 of the refractory lining of the sidewalls 16 is preferably also protected from falling bed particles by being arranged below a bend of the sidewall 16, although the bend of the sidewall 16 is not shown in FIG. 1. Because the upper edge 44 of the refractory lining of the sidewall 16 is at a lower level than that of the front wall 12 and rear wall 14, there is a corner region 48 between two tubular waterwalls, only one of which has a refractory lining.

Figure 2:
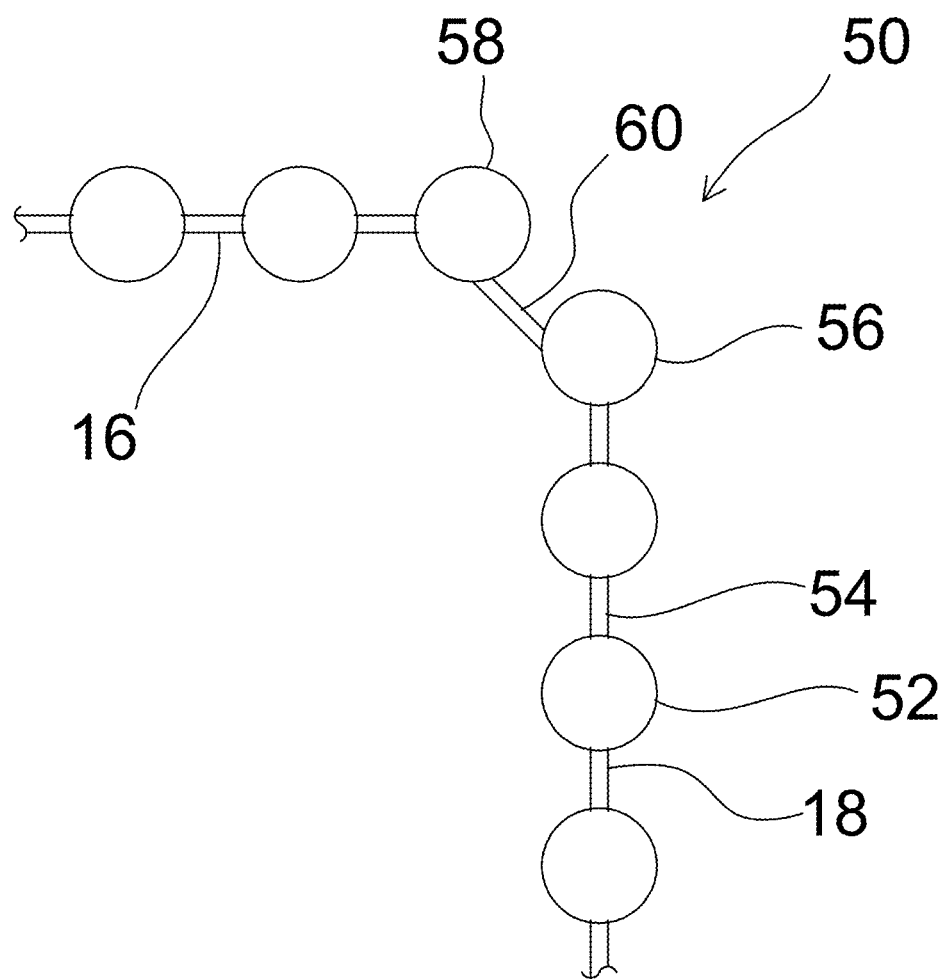
FIG. 2 schematically shows a horizontal cross section of a corner structure along line A-A of FIG. 1.

FIG. 2 schematically shows a horizontal cross-sectional view of the structure of a corner section 50 in the fluidized bed reactor 10 of FIG. 1, taken along line A-A, in a level above any refractory lining. FIG. 2 thus shows the vertical upper wall portion 18 of the rear wall 14 and a portion of the sidewall 16. Both the sidewall 16 and the upper wall portion 18 are conventional tubular waterwalls, consisting of bare vertical water tubes 52 interconnected by fins 54 that are centrally attached to the tubes 52. The outermost tubes 56, 58 of the upper wall portion 18 and the sidewall 16, respectively, are connected together by a planar upper beveled corner fin 60 that is in an angle of forty five degrees to the planes of the upper wall portion 18 and the sidewall 16. The upper beveled corner fin 60, which has advantageously a width that is approximately equal to the width of the fins 54 between the adjacent tubes 52 on the sidewall 16 and wall portion 18, is advantageously connected to an inner portion of the outermost tubes 56 and 58 for a reason to be explained below.

Figure 3:
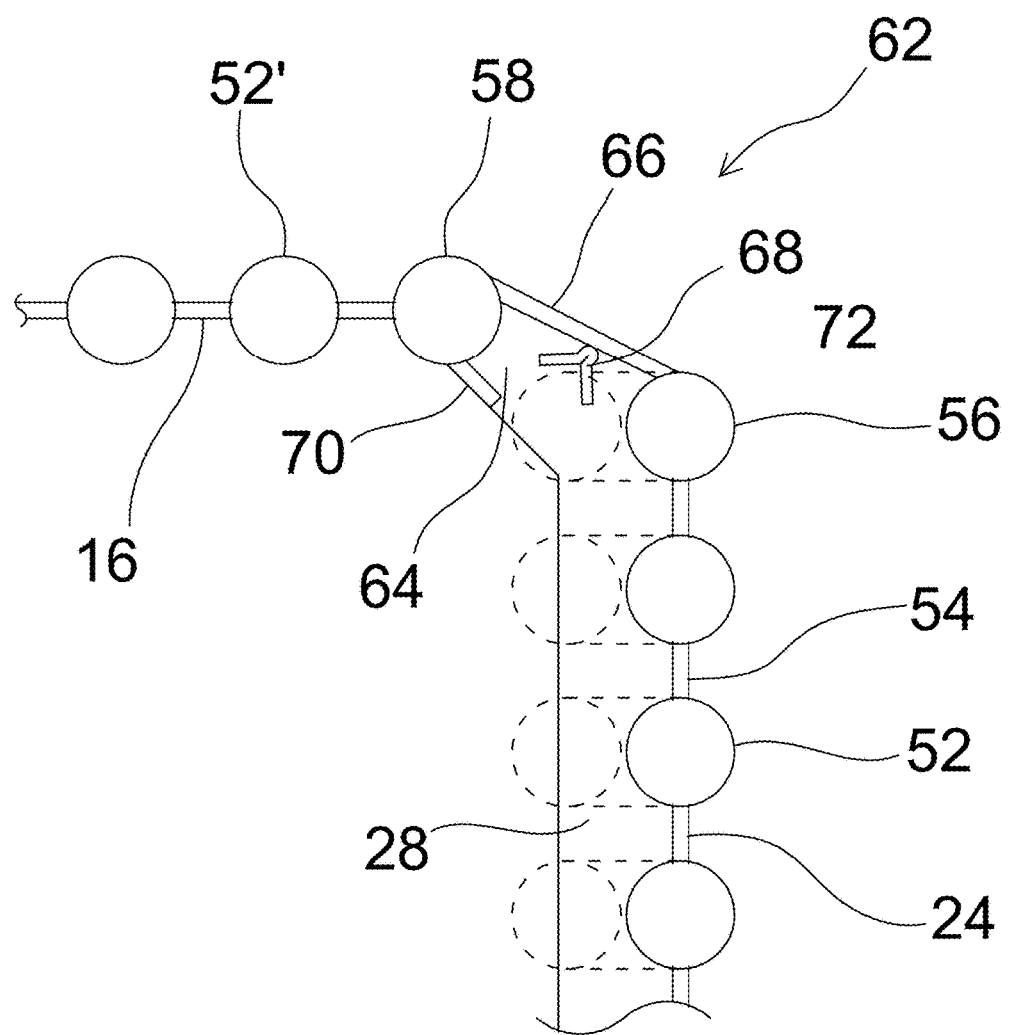
FIG. 3 schematically shows a horizontal cross section of a corner structure along line B-B of FIG. 1.

FIG. 3 schematically shows a horizontal cross-sectional view of the structure of a corner section 62 in the fluidized bed reactor of FIG. 1, taken along line B-B. The cross-sectional view is from a level below the edge 30 of the refractory lining 28 of the vertical outwards shifted portion 24 of the rear wall 14. FIG. 3 thus shows the corner structure 62 between the outwards shifted wall portion 24 and the sidewall 16. Both the wall portion 24 and the sidewall 16 are conventional tubular waterwalls consisting vertical water tubes 52, 52' interconnected by fins 54 centrally attached to the tubes. The size of the shift, or bending of tubes 52, from the upper portion 18 of the rear wall to the outwards shifted portion 24 of the rear wall 14 is indicated in FIG. 3 by the dashed lines showing the initial positions of the tubes 52 of the rear wall 14, as of above the shift.

At the level of FIG. 3, the water tubes 52' of the sidewall 16 are bare, i.e., not covered by a refractory lining, but the water tubes 52 of the outwards shifted wall portion 24 are on the inner side covered by a refractory lining 28. The bare tubes 52', or at least, for example, two tubes closest to the corner are advantageously protected by an abrasion protecting weld overlay, which is, however, not shown in FIG. 3.

The outermost tubes 56, 58 of the outwards shifted wall portion 24 and of the sidewall 16 are connected together by a lower beveled corner fin 66. Because of the shift of the wall portion 24, the angle between the lower beveled corner fin 66 and each of the planes of the sidewall 16 and the wall portion 24 is more than forty five degrees. The width of the lower beveled corner fin 66 is thereby clearly larger than that of the fins 54 in the wall portion 24 and the sidewall 16.

In order to avoid overheating of the wide lower beveled corner fin 66, the refractory lining 28 has a wedge-like extension 64 arranged on the inner surface of the lower beveled corner fin 66, that extends up to the outermost tube 58 of the sidewall 16. In order to be able to increase the thickness of the wedge-like extension 64 of the refractory lining 28, the lower beveled corner fin 66 is advantageously connected to an outer portion of the outermost tubes 56 and 58. Due to the increased thickness of the wedge-like extension 64 of the refractory lining 28, the extension can advantageously be secured by an anchor 68, preferably made of an alloy or ceramic, attached to the inner surface of the lower beveled corner fin 66.

In order to prevent the end portion of the wedge-like extension 64 of the refractory lining 28 from cracking loose from the outermost tube 58 of the sidewall 16, the upper beveled corner fin 60, shown in FIG. 2, advantageously has a direct extension downwards to the level range of the corner section 62 forming a partial fin 70 therein. The partial fin 70 is thus in the same plane as the upper beveled corner fin 60, but it advantageously has a width that is smaller that of the corner fin 60. The end portion of the wedge-like extension 64 of the refractory lining 28 then extends from the lower beveled corner fin 66 to the plane of the partial fin 70, and is secured in a partial cavity formed by the lower beveled corner fin 66 and the partial fin 70.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

We claim:

1. A tubular waterwall structure in a fluidized bed reaction chamber, the tubular waterwall structure comprising:
    multiple vertically extending tubular waterwalls defining the fluidized bed reaction chamber, the tubular waterwalls comprising horizontally adjacent first and second wall portions forming a corner structure and being constituted by vertical tubes interconnected by fins centrally attached to the tubes and having a first width,
    wherein (i) the first wall portion has an outermost tube next to the corner structure, an upper portion defining an upper vertical plane in an upper level range and a lower portion defining a lower vertical plane in a lower level range, the lower portion having a refractory lining and each of the tubes of the first wall portion being bent in an intermediate level region between the upper level region and the lower level region so that the lower vertical plane is shifted outwards from the upper vertical plane, (ii) the second wall portion is vertical and has an outermost tube next to the corner, and (iii) the outermost tube of the second wall portion is in the lower level region connected to the outermost tube of the first wall portion by a planar lower beveled corner fin having a refractory lining and a width that is larger than the first width.

2. A tubular waterwall structure in a fluidized bed reaction chamber according to claim 1, wherein the width of the lower beveled corner fin is at least twice the first width.

3. A tubular waterwall structure in a fluidized bed reaction chamber according to claim 1, wherein the second wall portion does not have a refractory lining.

4. A tubular waterwall structure in a fluidized bed reaction chamber according to claim 1, wherein at least two outermost tubes of the second wall portion are coated with erosion resistant weld overlay.

5. A tubular waterwall structure in a fluidized bed reaction chamber according to claim 1, wherein the refractory lining of the lower portion of the first wall portion extends in horizontal direction at most to a vertical extension of the vertical plane of the upper portion.

6. A tubular waterwall structure in a fluidized bed reaction chamber according to claim 1, wherein the lower beveled corner fin is connected to an outer portion of the outermost tube of each of the first and second wall portions.

7. A tubular waterwall structure in a fluidized bed reaction chamber according to claim 1, wherein the outermost tube of the second wall portion is in the upper level region connected to the outermost tube of the first wall portion by a planar upper beveled corner fin having a width that is substantially equal to the first width.

8. A tubular waterwall structure in a fluidized bed reaction chamber according to claim 7, wherein the upper beveled corner fin forms an angle of about forty five degrees with each of the first and second wall portions.

9. A tubular waterwall structure in a fluidized bed reaction chamber according to claim 7, wherein the upper beveled corner fin is connected to an inner portion of the outermost tube of each of the first and second wall portions.

10. A tubular waterwall structure in a fluidized bed reaction chamber according to claim 7, wherein the plane of the lower beveled corner fin forms an angle from five degrees to fifteen degrees with the plane of the upper beveled corner fin.

11. A tubular waterwall structure in a fluidized bed reaction chamber according to claim 7, wherein the upper beveled corner fin comprises a planar vertically extending partial fin to the lower level region, the partial fin being attached to the outermost tube of the second wall portion and not attached to the outermost tube of the first wall portion.

12. A tubular waterwall structure in a fluidized bed reaction chamber according to claim 11, wherein the width of the vertically extending partial fin is substantially equal to the first width.

13. A tubular waterwall structure in a fluidized bed reaction chamber according to claim 11, wherein the width of the vertically extending partial fin is smaller than the first width.

14. A tubular waterwall structure in a fluidized bed reaction chamber according to claim 13, wherein the width of the vertically extending partial fin is less than 70% of the first width.

15. A tubular waterwall structure in a fluidized bed reaction chamber according to claim 11, wherein an outer surface of the refractory lining of the lower beveled corner fin abuts the outermost tube of the second wall portion at the vertically extending partial fin.

16. A tubular waterwall structure in a fluidized bed reaction chamber according to claim 11, wherein the refractory lining of the lower beveled corner fin extends in horizontal direction to a plane formed as a horizontal extension of the vertically extending partial fin.

17. A tubular waterwall structure in a fluidized bed reaction chamber according to claim 16, wherein the refractory lining of the lower beveled corner fin is secured to the lower beveled corner fin by an anchor attached to the lower beveled corner fin.

18. A fluidized bed reaction chamber comprising:
a tubular waterwall structure, the tubular wall structure comprising:
multiple vertically extending tubular waterwalls defining the fluidized bed reaction chamber, the tubular waterwalls comprising horizontally adjacent first and second wall portions forming a corner structure and being constituted by vertical tubes interconnected by fins centrally attached to the tubes and having a first width,
wherein (i) the first wall portion has an outermost tube next to the corner structure, an upper portion defining an upper vertical plane in an upper level range and a lower portion defining a lower vertical plane in a lower level range, the lower portion having a refractory lining and each of the tubes of the first wall portion being bent in an intermediate level region between the upper level region and the lower level region so that the lower vertical plane is shifted outwards from the upper vertical plane, (ii) the second wall portion is vertical and has an outermost tube next to the corner, and (iii) the outermost tube of the second wall portion is in the lower level region connected to the outermost tube of the first wall portion by a planar lower beveled corner fin having a refractory lining and a width that is larger than the first width.

19. A fluidized bed reaction chamber according to claim 18, wherein the width of the lower beveled corner fin is at least twice the first width.

20. A fluidized bed reaction chamber according to claim 18, wherein the second wall portion does not have a refractory lining.

21. A fluidized bed reaction chamber according to claim 18, wherein at least two outermost tubes of the second wall portion are coated with erosion resistant weld overlay.

22. A fluidized bed reaction chamber according to claim 18, wherein the refractory lining of the lower portion of the first wall portion extends in horizontal direction at most to a vertical extension of the vertical plane of the upper portion.

23. A fluidized bed reaction chamber according to claim 18, wherein the lower beveled corner fin is connected to an outer portion of the outermost tube of each of the first and second wall portions.

24. A fluidized bed reaction chamber according to claim 18, wherein the outermost tube of the second wall portion is in the upper level region connected to the outermost tube of the first wall portion by a planar upper beveled corner fin having a width that is substantially equal to the first width.

25. A fluidized bed reaction chamber according to claim 24, wherein the upper beveled corner fin forms an angle of about forty five degrees with each of the first and second wall portions.

26. A fluidized bed reaction chamber according to claim 24, wherein the upper beveled corner fin is connected to an inner portion of the outermost tube of each of the first and second wall portions.

27. A fluidized bed reaction chamber according to claim 24, wherein the plane of the lower beveled corner fin forms an angle from five degrees to fifteen degrees with the plane of the upper beveled corner fin.

28. A fluidized bed reaction chamber according to claim 24, wherein the upper beveled corner fin comprises a planar vertically extending partial fin to the lower level region, the partial fin being attached to the outermost tube of the second wall portion and not attached to the outermost tube of the first wall portion.

29. A fluidized bed reaction chamber according to claim 28, wherein the width of the vertically extending partial fin is substantially equal to the first width.

30. A fluidized bed reaction chamber according to claim 28, wherein the width of the vertically extending partial fin is smaller than the first width.

31. A fluidized bed reaction chamber according to claim 30, wherein the width of the vertically extending partial fin is less than 70% of the first width.

32. A fluidized bed reaction chamber according to claim 28, wherein an outer surface of the refractory lining of the lower beveled corner fin abuts the outermost tube of the second wall portion at the vertically extending partial fin.

33. A fluidized bed reaction chamber according to claim 28, wherein the refractory lining of the lower beveled corner fin extends in horizontal direction to a plane formed as a horizontal extension of the vertically extending partial fin.

34. A fluidized bed reaction chamber according to claim 33, wherein the refractory lining of the lower beveled corner fin is secured to the lower beveled corner fin by an anchor attached to the lower beveled corner fin.

* * * * *